US006798599B2

(12) United States Patent
Dykes et al.

(10) Patent No.: US 6,798,599 B2
(45) Date of Patent: Sep. 28, 2004

(54) DISC STORAGE SYSTEM EMPLOYING NON-VOLATILE MAGNETORESISTIVE RANDOM ACCESS MEMORY

(75) Inventors: John W. Dykes, Eden Prairie, MN (US); Tony R. Blankenhagen, Crystal, MN (US); William D. Mosley, Savage, MN (US)

(73) Assignee: Seagate Technology LLC, Scotts Valley, CA (US)

( * ) Notice: Subject to any disclaimer, the term of this patent is extended or adjusted under 35 U.S.C. 154(b) by 288 days.

(21) Appl. No.: 09/946,878

(22) Filed: Sep. 5, 2001

(65) Prior Publication Data

US 2002/0101677 A1 Aug. 1, 2002

Related U.S. Application Data

(60) Provisional application No. 60/264,893, filed on Jan. 29, 2001.

(51) Int. Cl.[7] .................. G11B 15/18; G11B 17/00; G11B 21/04
(52) U.S. Cl. .................. 360/69; 360/74.1; 360/75
(58) Field of Search .................. 360/69, 74.1, 75; 711/113, 112; 714/24

(56) References Cited

U.S. PATENT DOCUMENTS

| | | | | |
|---|---|---|---|---|
| 5,267,097 A | * | 11/1993 | Ogino et al. | 360/49 |
| 5,289,410 A | | 2/1994 | Katti et al. | 365/170 |
| 5,535,372 A | * | 7/1996 | Benhase et al. | 703/23 |
| 5,586,291 A | | 12/1996 | Lasker et al. | 395/440 |
| 5,640,343 A | | 6/1997 | Gallagher et al. | 365/171 |
| 5,732,016 A | | 3/1998 | Chen et al. | 365/158 |
| 5,793,553 A | * | 8/1998 | Smith | 360/74.1 |
| 5,806,085 A | * | 9/1998 | Berliner | 711/113 |
| 5,889,629 A | * | 3/1999 | Patton, III | 360/75 |
| 5,889,933 A | * | 3/1999 | Smith | 714/22 |
| 6,055,178 A | | 4/2000 | Naji | 365/158 |
| 6,097,625 A | | 8/2000 | Scheuerlein | 365/171 |
| 6,157,984 A | | 12/2000 | Fisher et al. | 711/112 |
| 6,205,494 B1 | | 3/2001 | Williams | 710/5 |
| 6,259,126 B1 | | 7/2001 | Hsu et al. | 257/298 |
| 6,263,398 B1 | | 7/2001 | Taylor et al. | 711/3 |
| 6,295,577 B1 | * | 9/2001 | Anderson et al. | 711/113 |
| 6,342,984 B1 | * | 1/2002 | Hussein et al. | 360/69 |
| 6,516,426 B1 | * | 2/2003 | Forehand et al. | 714/24 |
| 6,546,456 B1 | * | 4/2003 | Smith et al. | 711/112 |
| 6,590,750 B2 | * | 7/2003 | Abraham et al. | 360/324.2 |

OTHER PUBLICATIONS

"Motorola aims to simple 4–Mbit MRAM in 2003", download from http://www.eet.com undated.

(List continued on next page.)

*Primary Examiner*—David Hudspeth
*Assistant Examiner*—Jason Olson
(74) *Attorney, Agent, or Firm*—Westman, Champlin & Kelly

(57) ABSTRACT

An apparatus and method for caching data in a disc storage system are provided. The disc storage system includes a host computer interface adapted to couple to a host computer, a disc storage medium having a disc surface and a spindle motor coupled to the disc adapted to rotate the disc. A transducer is positioned for reading and writing data on the disc surface. The system further includes a non-volatile magnetoresistive random access memory buffer adapted to temporarily store data during read and write operations and to store data during a power loss to the disc storage system.

22 Claims, 4 Drawing Sheets

OTHER PUBLICATIONS

"Motorla Demonstrates Revolutionary Memory Technology: MRAM Targeted for Future" for PRESI.com, download at http://www.Pressi.com, Dec. 5, 2000.

"Motorola Demonstrates Revolutionary Memory Technology: MRAM Targeted for Future 'Smart' Products", for *ChipCenter* May 10, 2000, downloaded at http://www.chipcenter.com.

"Memories are Forever" by David Rotman for *Technology Review*, downloaded from http://techreview.com, May/Jun. 2000.

"Will Spintronics Replace Conventional Electronics?" for *R&D Magazine Online*, pp. 1–5, undated.

"Magnetoelectronics" by Gary A. Prinz, for *Science's Compass Review*, vol 282, downloaded from http://www/sciencemag.com, Nov. 27, 1998.

"Motorola believes MRAM could replace early al memory technologies" for *Semiconductor Business News*, May 10, 2000.

* cited by examiner

DISC STORAGE SYSTEM EMPLOYING NON-VOLATILE MAGNETORESISTIVE RANDOM ACCESS MEMORY

CROSS-REFERENCE TO RELATED APPLICATION

This application claims benefit of U.S. Provisional Application No. 60/264,893, filed Jan. 29, 2001 and entitled HARD DISC DRIVE EMPLOYING NON-VOLATILE MRAM.

FIELD OF THE INVENTION

The present invention relates to disc storage systems. More specifically, the present invention relates to a buffer memory for a disc storage system.

BACKGROUND OF THE INVENTION

Disc storage systems, such as magnetic or optical disc storage systems, are used to store information for subsequent retrieval. The speed at which information can be written to or read from the disc is determined by a number of physical constraints. For example, if the transducer which is used to write information to or read information from the disc surface is positioned over one area of the disc and data needs to be written to or read from another area of the disc, the transducer must be physically moved between annular data tracks across the disc surface. Further, as the disc rotates, the write or read operation may be delayed until the disc rotates to the proper position.

The delay in writing information to, or reading information from a disc surface can introduce delays in a host computer when writing to or reading from the disc storage system. For example, the host computer must wait for the disc storage system to complete the write or read operation. One technique for reducing this waiting time is to add a cache or buffer memory to the host computer or the disc storage system.

When the host computer initiates a data write operation for example, the data is first written to the buffer memory. After the data has been written to the buffer, the host computer can continue with subsequent operations and is not required to wait until the write operation is complete. The data is removed from the buffer as it is needed by the disc and when it can be written onto the disc surface.

Buffer memories also capitalize on the characteristic that once a host computer reads data from or writes data to disc drives, it is very likely that this data will be reused by the host computer in the near future. Thus, frequently used data or instructions are replicated in buffer memories.

Retrieving data from the buffer memory avoids the necessity of accessing one or more discs of the disc drive which are relatively slow compared to the buffer memory. Therefore, data retrieval is accomplished more rapidly which, in turn, leads to an overall increase in system performance.

As mentioned above, caching techniques can be implemented in the host computer or the disc storage system. There are a number of problems with caching techniques implemented in the host computer. These techniques take processing time from the host computer to manage the buffer. Further, since the host computer is responsible for storing the data, data can still be lost at the disc drive level. In addition, these techniques usually require the host computer to be specially configured.

Conventional caching techniques employed in disc storage systems typically utilize dynamic random access memory (DRAM) devices. DRAM cells are fast and expend little power, but have to be refreshed many times each second and require complex structures to incorporate a capacitor in each cell. Further, DRAM cells are "volatile" in the sense that upon power-down, the memory contents are lost.

The present invention addresses these problems and offers other advantages over the prior art.

SUMMARY OF THE INVENTION

The present invention relates to a disc storage system employing a non-volatile magnetoresistive random access memory (MRAM) buffer, thereby addressing the above-identified problems.

In accordance with one embodiment, the present invention includes a disc storage system having a host computer interface adapted to couple to a host computer, a disc storage medium having a disc surface and a spindle motor coupled to the disc adapted to rotate the disc. A transducer is positioned for reading and writing data on the disc surface. The system further includes a non-volatile MRAM buffer adapted to temporarily store data during read and write operations and to preserve stored data during a power loss to the disc storage system.

Another embodiment relates to a method of caching data in a disc storage system. The method includes temporarily storing data in a non-volatile MRAM buffer during read and write operations. The method further includes preserving data stored in the non-volatile MRAM buffer during a power loss to the storage system.

These and various other features as well as advantages which characterize embodiments of the present invention will be apparent upon reading of the following detailed description and review of the associated drawings.

DETAILED DESCRIPTION OF ILLUSTRATIVE EMBODIMENTS

Figure 1:
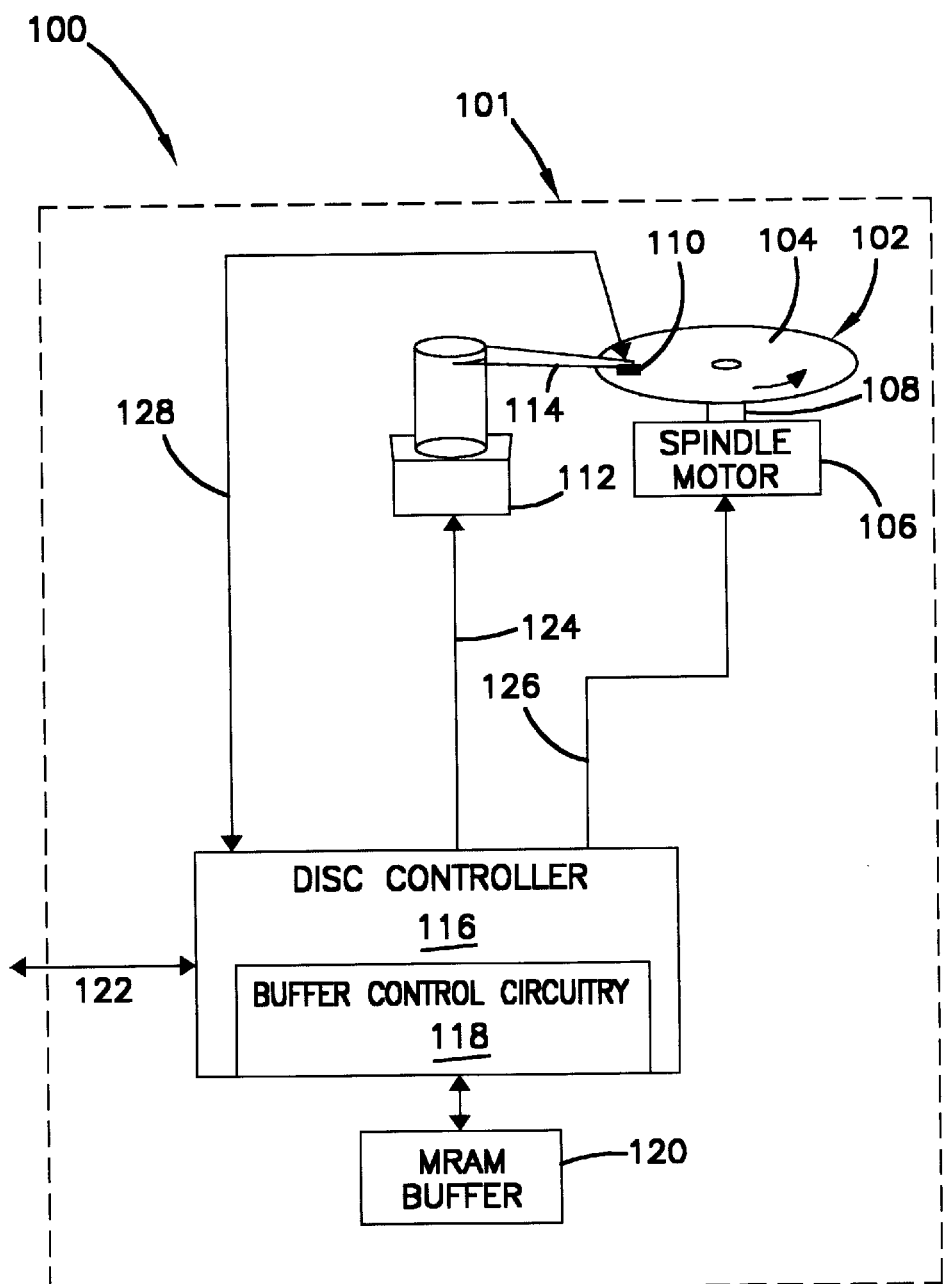
FIG. 1 is a simplified block diagram of a disc storage system in accordance with an embodiment of the present invention.

Referring now to FIG. 1, a very simplified block diagram of a disc storage system 100 in accordance with an embodiment of the present invention, is shown. Disc storage system 100 includes a housing 101 and a disc storage medium 102 having a data surface 104. Disc 102 is coupled to a spindle motor 106 through a spindle 108. A transducing head 110 is positioned relative to surface 104 for reading and writing information onto surface 104. Transducer 110 is coupled to an actuator 112 through an actuator arm 114. Transducer 110 can read and write information on a desired location on surface 104 by moving transducer 110 with actuator 112 in a manner to position transducer 110 radially while disc 102 rotates.

System 100 further includes disc controller 116 and buffer control circuitry 118. Buffer controller 118 is coupled to non-volatile MRAM buffer 120. Controller 116 further couples to a host computer interface 122 which may comprise any type of data exchange interface for coupling to a disc controller in a host computer such as SCSI (Small Computer System Interface), UDMA (Ultra Direct Memory Access), ATA (Advance Technology Attachment), or other standards as are known in the industry or are developed in the future.

Controller 116 controls the radial position of transducer 110 by energizing actuator 112 over control connection 124. Further, controller 116 controls operation of motor 106 over control connection 126. Thus, controller 116 can position transducer 110 to substantially any desired location on disc surface 104. Once positioned, information can be read from, or written to, disc surface 104 by sending or receiving data through read/write channel 128 which couples control circuitry to transducer 110.

MRAM buffer 120 is included in disc storage system 100 to mediate data flow between the relatively slow but large capacity storage of data surfaces, such as 104, in disc storage system 100 and the relatively fast but low capacity memory of the host computer (not shown in FIG. 1). Disc controller 116 and buffer control circuitry 118 control the intermediate storage of data in MRAM buffer 120. For example, in response to a write command from the host computer, the controller 116 and buffer circuitry 118 allocates a predetermined number of memory blocks in MRAM buffer 120. Host supplied write data may then be stored in the allocated blocks of MRAM buffer 120. The write-data is then stored on disc surface 104 at which point the blocks of MRAM buffer 102 may be de-allocated. In the event of power failure, data stored in MRAM buffer 120 but not yet written to disc surface 104 is preserved. When power is restored, the data preserved in MRAM buffer 120 is written to disc surface 104. Similarly, during a read operation data is intermediately stored in MRAM buffer 120 before it is transferred to the host system.

MRAM buffer 120 is an array of magnetic memory cells. Typically, each memory cell includes two magnetic layers separated by a non-magnetic layer. Magnetic resistance over a magnetic memory cell indicates minimum and maximum values when magnetization vectors in the magnetic layers point in the same (parallel) or opposite (anti-parallel) directions, respectively. Parallel and anti-parallel directions, for example, are logically defined as "0" and "1" states, respectively.

U.S. Pat. No. 5,640,343, entitled MAGNETIC MEMORY ARRAY USING MAGNETIC TUNNEL JUNCTION DEVICES IN THE MEMORY CELLS describes one type of MRAM cell. Each memory cell is a magnetic tunnel junction (MTJ) element and a diode electrically connected in series. Each MTJ is formed of a pinned ferromagnetic layer whose magnetization direction is prevented from rotating, a free ferromagnetic layer whose magnetization direction is free to rotate between states of parallel and anti-parallel to the fixed magnetization of the pinned ferromagnetic layer, and an insulating tunnel barrier between and in contact with the two ferromagnetic layers. Each memory cell has a high resistance that is achieved in a very small surface area by controlling thickness, and thus, the electrical barrier height, of the tunnel barrier layer. The memory cells in the array are controlled by only two lines, and the write currents to change the magnetic state of an MTJ, by using the write currents' inherent magnetic fields to rotate to the magnetization of the free layer, do not pass through the tunnel barrier layer. All MTJ elements, diodes, and contacts are vertically arranged at the intersection regions of the two lines and between the two lines to minimize the total MRAM surface area. The power expended to read or sense the memory cell's magnetic state is reduced by the high resistance of the MTJ and by directing the sensing current through a single memory cell.

Figure 2:
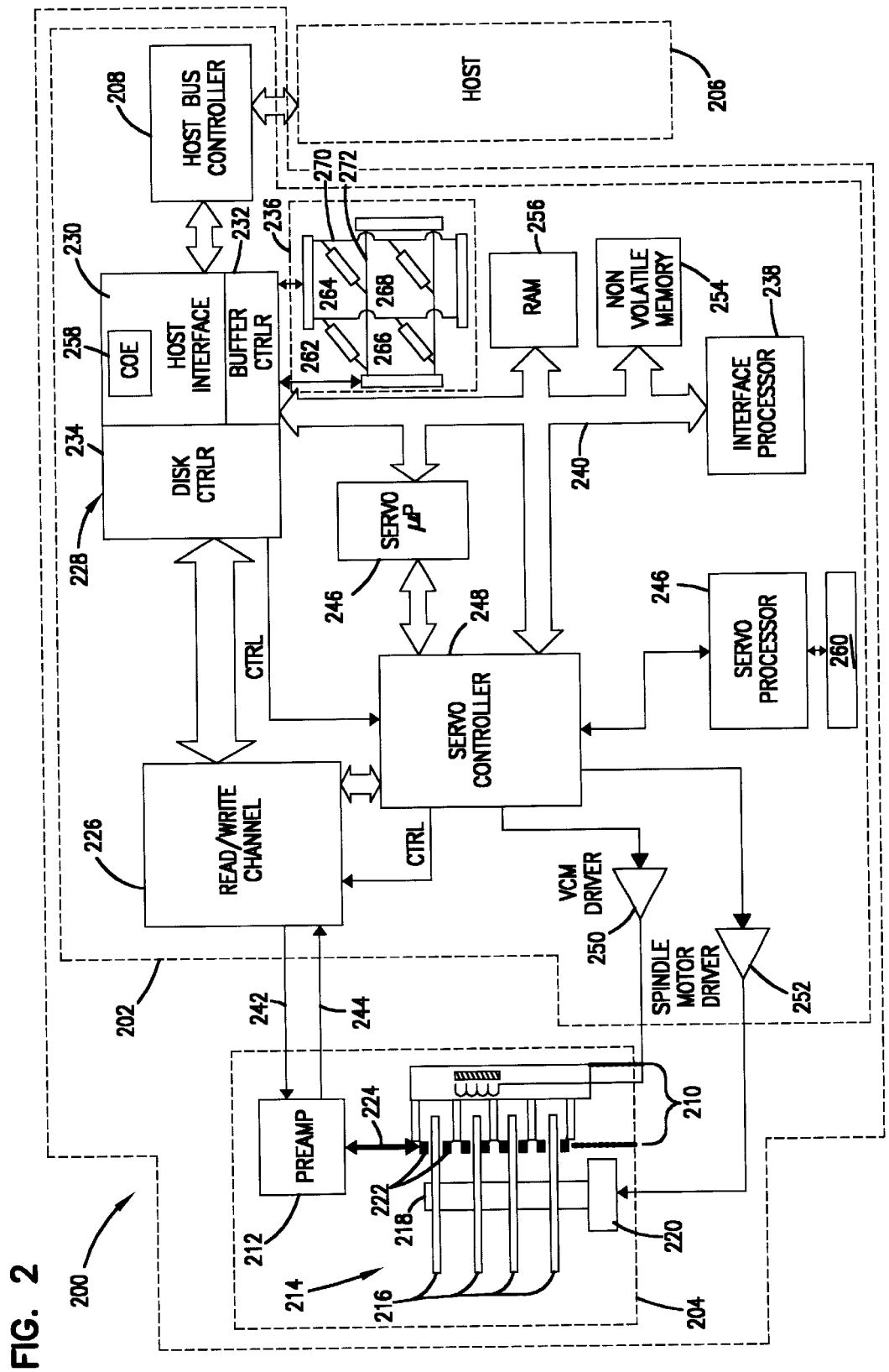
FIG. 2 is a simplified block diagram of a disc storage system employing an MRAM buffer with each magnetic memory cell of the buffer controlled by only two lines in accordance with an embodiment of the present invention.

Referring now to FIG. 2, a simplified block diagram of a disc storage system employing an MRAM buffer with each memory cell controlled by only two lines in accordance with an embodiment of the present invention is shown. Disc storage system 200 includes a printed circuit board assembly (PCBA) 202 and a head-disc assembly (HDA) 204. PCBA 202 includes circuitry and processors, which provide a target interface controller for communicating between a host system 206 and HDA 204. Host system 206 can include a microprocessor-based data processing system such as a personal computer or other system capable of performing a sequence of logical operations. Data is transmitted between host system 206 and PCBA 202 via a host bus connector 208. HDA 204 includes an actuator assembly 210, a preamplifier 212, and a disc assembly 214. Disc assembly 214 includes a plurality of media discs, stacked on a spindle assembly 218. Spindle assembly 218 is mechanically coupled to a spindle motor 220 for rotating the disc at a high rate of speed.

Actuator assembly 210 includes a voice coil motor, and multiple actuator arms. Located at the end of each actuator arm are one or more transducer heads such as 222, which are associated with a respective disc surface. Transducer heads 222 communicate with disc controller circuit board 202 via a cable assembly 224 connected to preamplifier 212 for reading and writing data to the transducer head's associated disc surface. Preamplifier 212 provides an amplified signal to a read/write channel 226 of PCBA 202. Read/write channel 226 performs encoding and decoding of data written to and read from the disc.

A servo processor 246 provides intelligent control of actuator assembly 210 and spindle motor 220 through a servo controller 248. By commands issued to servo controller 248 by servo processor 246, VCM driver 250 is coupled to move actuator assembly 210 and spindle motor driver 252 is coupled to maintain a constant spin rate of spindle motor 220.

PCBA 202 includes a host interface disc controller (HIDC) application-specific integrated circuit (ASIC) 228. ASIC 228 includes a host interface 230, a buffer controller 232, and a disc controller 234. Host interface 230 communicates with host system 206 via host bus connector 208 by receiving commands and data from and transmitting status and data back to host system 206. A command cueing engine (CQE) 258 is incorporated in host interface 230.

Buffer controller 232 controls a non-volatile MRAM buffer memory 236, which is an array of magnetic memory cells. As can be seen in FIG. 2, MRAM buffer 236 is illustrated as a simple array of four magnetic memory cells 262, 264, 266 and 268. A selected cell 264, for example, is written by passing current $I_b$ through bit line 270 and current $I_w$ through word line 272. All bit and word lines, such as lines 270 and 272, are coupled to buffer controller 232 that controls the selection of the memory cells. The magnetic field produced by either $I_b$ or $I_w$ alone in the region of the cells is less than the magnetic field required to change the magnetic state in a cell, so half-selected cells 262, 266, 268 (those over which $I_b$ or $I_w$ alone is passing) are not written. However, the combination of magnetic fields from $I_b$ and $I_w$ is sufficient to change the state of selected memory cell 264. In general, any cell or multiple cells along a word line could be selected by energizing more than one bit line. The resistance of the selected memory cell 264 determines a sense current Is that flows from the bit line 270 through the selected memory cell 264 to the word line 272. In the sense circuitry included in buffer controller 232, $I_s$ is compared to a reference current set to a value halfway between the expected values for the two possible states of the memory cell and the difference is amplified to read the data stored in selected cell 264. As mentioned above, the magnetization direction in a magnetic memory cell is maintained even without a magnetic field. Thus, data preserved in MRAM buffer 236 can be recovered by buffer controller 232 when power is restored to disc storage system 200.

Disc controller 234 tracks the timing of data sectors passing under a currently selected transducer head and accordingly sends data to and receives data from read/write channel 226. Disc controller 234 also provides for error correction and error detection on data transmitted to and read from discs 214.

An interface processor 238 manages a cue of commands received from host 206 with the assistance of the CQE 258 embedded in host interface 230. Interface processor 238 interfaces with functional elements of PCBA 202 over a bus 240, for transfer of commands, data, and status.

Disc system operational programs may be stored in non-volatile program storage memory 254, such as read-only memory (ROM) or flash memory, and are loaded into random access memory (RAM) or program loading memory 256 for execution by interface processor 238. Suitably, servo processor 246 may have integrated or separate memory 260 for storage of servo programs.

In some embodiments of the present invention, MRAM arrays may be employed as non-volatile program storage memory 254, program loading memory 256 and servo program storage memory 260. When MRAM is employed for different memory units, such as 236, 254, 256 and 260 of the disc storage system, the different units may be formed as a single memory chip. Integration of the different MRAM units is less complex than mixed memory integration. Integration of chips results in an overall decrease in size, less complexity and lower cost. Additionally, since the integration of the memory units is simplified, the different processors and circuitry of PCBA 202 can be integrated on a single chip as a system-on-a-chip with reduced complexity.

Figure 3:
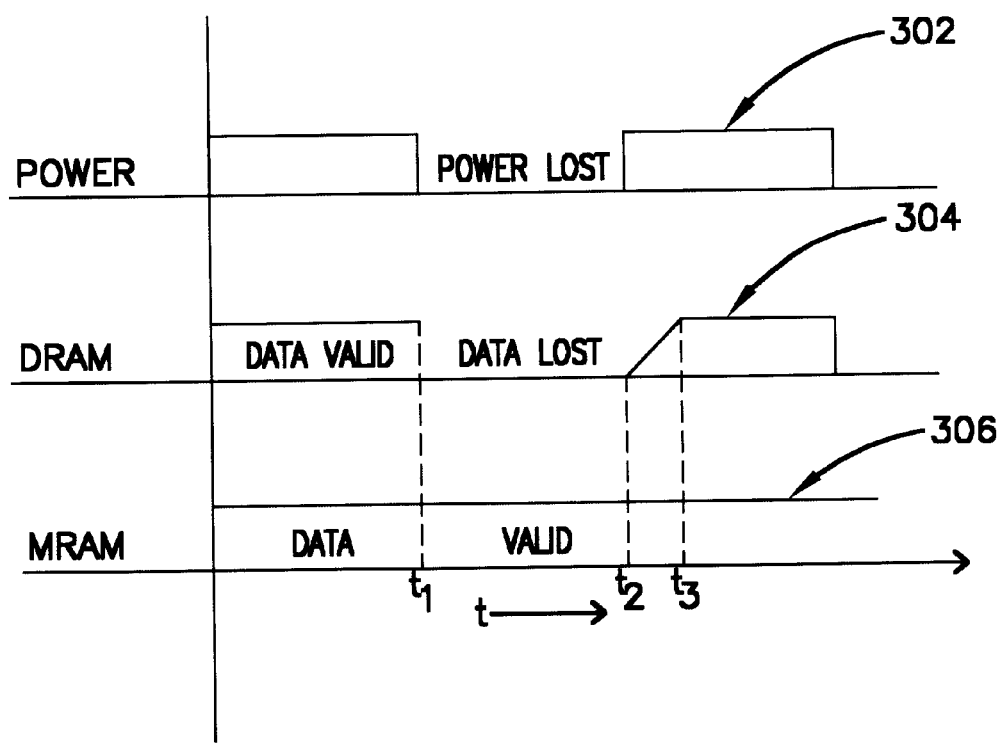
FIG. 3 shows a comparison between the operation of a DRAM buffer employed in prior art disc storage systems and an MRAM buffer employed in disc storage systems of the present invention when a power loss to the disc storage system occurs.

Referring now to FIG. 3, a comparison between the operation of a DRAM buffer employed in prior art disc storage systems and an MRAM buffer employed in disc storage systems of the present invention when a power loss to the disc storage system occurs, is shown. Plot 302 represents power supplied to the disc storage system as a function of time "t." Plots 304 and 306 represent the operation of a prior art DRAM buffer and an MRAM buffer used with the present invention, respectively, when power to the disc storage system is lost and subsequently restored. At time "$t_1$" a loss of power to the storage system occurs. Since the prior art DRAM buffer is volatile, when a loss of power occurs at "$t_1$," the contents of the DRAM buffer are lost. However, the contents of the MRAM buffer are preserved as the magnetization of each MRAM cell is maintained even when the magnetic field is removed. At time "$t_2$," power is restored to the disc storage system. DRAM takes a certain amount of time to initialize (difference in time between "$t_2$" and "$t_3$") before it is ready to receive data. However, data preserved in MRAM can be readily recovered or transferred from the buffer when power is restored.

Figure 4:
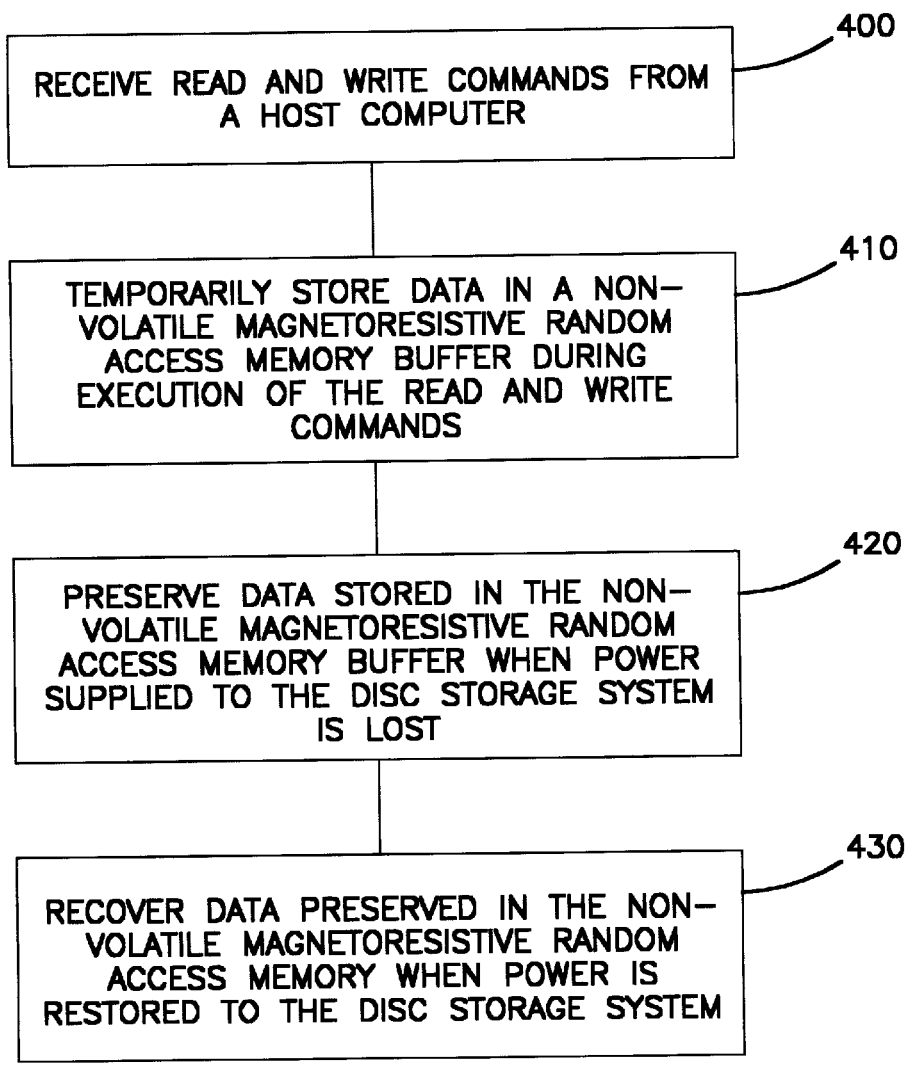
FIG. 4 is a flow chart of a method of caching data in a disc storage system in accordance with an embodiment of the present invention.

Referring now to FIG. 4, a flow chart of a method of caching data in a disc storage system in accordance with an embodiment of the present invention, is shown. At step 400, read and write commands are received from a host computer. At step 410, data is temporarily stored in a non-volatile magnetoresistive random access memory buffer during execution of the read and write commands. At step 420, data stored in the non-volatile magnetoresistive random access memory buffer is preserved when power supplied to the disc storage system is lost. At step 430, data preserved in the non-volatile random access memory is recovered when power is restored to the disc storage system.

In summary, a disc storage system (such as 100) is provided, which includes a rotatable storage disc (such as 102) having a disc surface (such as 104) and a spindle motor (such as 106) operably coupled to the disc which is adapted to rotate the disc. The system also includes a transducer (such as 110) adapted to read and write data on the disc surface. A non-volatile magnetoresistive random access memory buffer (such as 120) temporarily stores data during read and write operations and preserves data stored during a power loss to the disc storage system. A controller (such as 116) receives read and write commands from a host computer interface, and facilitates temporary storage of data in the magnetoresistive random access memory buffer during execution of the read and write commands, and recovers data preserved in the magnetoresistive random access memory buffer after power is restored to the disc storage system.

A method of caching data in a disc storage system includes a step, such as 400, for receiving read and write commands from a host computer. Data is temporarily stored in a non-volatile magnetoresistive random access memory buffer during execution of the read and write commands in a step such as 410. Data stored in the non-volatile magnetoresistive random access memory buffer is preserved when power supplied to the disc storage system is lost in a step, such as 420. Data preserved in the non-volatile random access memory is recovered when power is restored to the disc storage system in a step, such as 430.

It is to be understood that even though numerous characteristics and advantages of various embodiments of the invention have been set forth in the foregoing description, together with details of the structure and function of various embodiments of the invention, this disclosure is illustrative only, and changes may be made in detail, especially in matters of structure and arrangement of parts within the principles of the present invention to the full extent indicated by the broad general meaning of the terms in which the appended claims are expressed. For example, the particular elements may vary depending on the particular application for the disc storage system while maintaining substantially the same functionality without departing from the scope and spirit of the present invention. In addition, although the preferred embodiment described herein is directed to an MRAM buffer for a disc storage system, it will be appreciated by those skilled in the art that the teachings of the present invention can be applied to other systems that employ non-volatile buffer memory, without departing from the scope and spirit of the present invention. Further, the MRAM cell structures described above in connection with embodiments of the present invention are only illustrative in nature and those skilled in the art will appreciate that the present invention may be practiced with any type of MRAM cell structure.

What is claimed is:

1. A disc storage system, comprising:
   a rotatable storage disc having a disc surface;
   a spindle motor operably coupled to the disc which is adapted to rotate the disc;
   a transducer adapted to read and write data on the disc surface;
   a non-volatile magnetoresistive random access memory buffer adapted to temporarily store data during read and write operations and to preserve data stored during a power loss to the disc storage system; and
   a controller adapted to receive read and write commands from a host computer interface, and to facilitate temporary storage of data in the magnetoresistive random access memory buffer during execution of the read and write commands, and to recover data preserved in the magnetoresistive random access memory buffer after power is restored to the disc storage system.

2. The apparatus of claim 1 wherein the magnetoresistive random access memory buffer includes a plurality of magnetoresistive random access memory cells with each one of the plurality of memory cells including a magnetic tunnel junction and a diode.

3. The apparatus of claim 1 further including a program storage memory comprising an array of magnetoresistive random access memory cells.

4. The apparatus of claim 1 further including a program loading memory comprising an array of magnetoresistive random access memory cells.

5. The apparatus of claim 1 further including a servo program storage memory comprising an array of magnetoresistive random access memory cells.

6. The apparatus of claim 1 further comprising:
   a program storage memory;
   a program loading memory; and
   a servo program storage memory;
   wherein the magnetoresistive random access memory buffer, the program storage memory, the program loading memory and the servo program storage memory each include an array of magnetoresistive random access memory cells, and wherein all of said memories are integrated as a single memory chip.

7. The apparatus of claim 1 wherein the non-volatile magnetoresistive random access memory and the controller are integrated as a single chip.

8. A method of caching data in a disc storage system, comprising steps of:
   (a) receiving read and write commands from a host computer;
   (b) storing data temporarily in a non-volatile magnetoresistive random access memory buffer during execution of the read and write commands;
   (c) preserving data stored in the non-volatile magnetoresistive random access memory buffer when power supplied to the disc storage system is lost; and
   (d) recovering data preserved in the non-volatile random access memory when power is restored to the disc storage system.

9. The method of claim 8 wherein the magnetoresistive random access memory buffer is formed from a plurality of magnetoresistive random access memory cells with each one of the plurality of memory cells is formed with a magnetic tunnel junction and a diode.

10. The method of claim 8 further comprising storing disc storage system operational programs in a memory formed of an array of magnetoresistive random access memory cells.

11. The method of claim 8 further comprising loading disc storage system operational programs in a memory formed of an array of magnetoresistive random access memory cells.

12. The method of claim 8 further comprising storing disc servo programs in a memory formed of an array of magnetoresistive random access memory cells.

13. The method of claim 8 wherein the non-volatile magnetoresistive random access memory buffer memory is integrated on a single chip that includes a program storage memory, a program loading memory and a servo program storage memory, and wherein the magnetoresistive random access memory buffer, the program storage memory, the program loading memory and the servo program storage memory are each formed from an array of magnetoresistive random access memory cells.

14. The apparatus of claim 1 wherein the non-volatile magnetoresistive random access memory buffer and a disc controller are integrated as a single chip.

15. A disc storage system comprising:
   a transducer adapted to read and write data on a disc storage medium; and
   a non-volatile buffer means for caching data prior to writing data to and after reading data from the disc storage medium.

16. The apparatus of claim 15 wherein the non-volatile buffer means comprises a magnetoresistive random access memory buffer adapted to temporarily store data during read and write operations and to preserve data stored during a power loss to the disc storage system.

17. The apparatus of claim 16 wherein the magnetoresistive random access memory buffer includes a plurality of magnetoresistive random access memory cells with each one of the plurality of memory cells including a magnetic tunnel junction and a diode.

18. The apparatus of claim 16 further including a program storage memory comprising an array of magnetoresistive random access memory cells.

19. The apparatus of claim 16 further including a program loading memory comprising an array of magnetoresistive random access memory cells.

20. The apparatus of claim 16 further including a servo program storage memory comprising an array of magnetoresistive random access memory cells.

21. The apparatus of claim 16 further comprising:
   a program storage memory;
   a program loading memory; and
   a servo program storage memory;
   wherein the magnetoresistive random access memory buffer, the program storage memory, the program loading memory and the servo program storage memory each include an array of magnetoresistive random access memory cells, and wherein all of said memories are integrated as a single memory chip.

22. The apparatus of claim 16 wherein the non-volatile magnetoresistive random access memory buffer is integrated within a single printed circuit board assembly chip of the disc storage system.

* * * * *